United States Patent
Ruehle et al.

(10) Patent No.: US 6,840,459 B1
(45) Date of Patent: Jan. 11, 2005

(54) FUEL INJECTION VALVE

(75) Inventors: Wolfgang Ruehle, Ditzingen (DE); Hubert Stier, Asperg (DE); Matthias Boee, Ludwigsburg (DE); Guenther Hohl, Stuttgart (DE); Norbert Keim, Loechgau (DE)

(73) Assignee: Robert Bosch GmbH, Stuttgart (DE)

( * ) Notice: Subject to any disclaimer, the term of this patent is extended or adjusted under 35 U.S.C. 154(b) by 174 days.

(21) Appl. No.: 10/069,257

(22) PCT Filed: Aug. 17, 2000

(86) PCT No.: PCT/DE00/02801

§ 371 (c)(1),
(2), (4) Date: Jul. 8, 2002

(87) PCT Pub. No.: WO01/12977

PCT Pub. Date: Feb. 22, 2001

(30) Foreign Application Priority Data

Aug. 18, 1999 (DE) .......................... 199 39 133

(51) Int. Cl.⁷ .............................. B05B 1/08; B05B 3/04; B05B 1/30
(52) U.S. Cl. ................................. 239/102.2; 239/102.1; 239/88; 239/533.3; 239/533.13; 239/585.1; 239/585.5
(58) Field of Search ........................... 239/102.1, 102.2, 239/88, 89, 90, 91, 92, 533.2, 533.3, 533.7, 533.8, 533.9, 533.13, 585.1, 585.2, 585.3, 585.4, 585.5; 251/129.15, 129.21

(56) References Cited

U.S. PATENT DOCUMENTS

| | | | | |
|---|---|---|---|---|
| 4,813,601 A | * | 3/1989 | Schwerdt et al. | 239/91 |
| 4,858,439 A | | 8/1989 | Sawada et al. | |
| 6,062,533 A | * | 5/2000 | Kappel et al. | 251/57 |
| 6,085,990 A | * | 7/2000 | Augustin | 239/88 |

FOREIGN PATENT DOCUMENTS

| | | |
|---|---|---|
| DE | 195 00 706 | 7/1996 |
| DE | 197 08 304 | 9/1998 |
| DE | 198 54 506 | 4/2000 |

* cited by examiner

Primary Examiner—Davis Hwu
(74) Attorney, Agent, or Firm—Kenyon & Kenyon

(57) ABSTRACT

A fuel injector, in particular a fuel injector for fuel injection systems of internal combustion engines, has a piezoelectric or magnetostrictive actuator, a valve closing element that can be actuated by the actuator and that works together with a valve seat face to form a seal seat, and a temperature compensation device. The temperature compensation device has a housing that is elastically deformable along a direction of actuation of the actuator, and has at least one throttle that connects an interior space of the housing with a fuel inlet of the fuel injector. The cross-section of this throttle is dimensioned such that an entry and exit of fuel into the housing of the temperature compensation device is enabled when there is a temperature-caused change in length of components of the fuel injector.

13 Claims, 1 Drawing Sheet

FUEL INJECTION VALVE

FIELD OF THE INVENTION

The present invention relates to a fuel injector.

BACKGROUND INFORMATION

German Patent No. 195 00 706 describes a fuel injector. A stroke translator or path transformer is provided that converts a relatively small regulating distance of the actuator, for example a piezoactuator, into a larger stroke of the valve needle. Here, the extension of the actuator is introduced into an amplification (boost) chamber via a working piston of the stroke translator, and is transmitted via a lifting piston to the valve needle, which executes a stroke that is enlarged in relation to the piston surface that limits the amplification chamber at the face. In order to compensate temperature influences, wear, and manufacturing tolerances on the regulation path of the actuator, the amplification chamber has a defined leakage that is realized by an annular gap between the piston and a wall of the valve housing, and that has a resistance to flow that is high enough that the movements of the actuator are transmitted in essentially undampened fashion to the valve needle. The fuel itself diesel fuel in the case of German Patent No. 195 00 706—is used as the hydraulic medium for the stroke translation.

The fuel injector described in German Patent No. 195 00 706 has the disadvantage that, in particular at high speeds of the internal combustion engine, a high degree of heat loss occurs in the area of the annular gap, due to the frictional forces that occur when the actuator is actuated. The load and wear of the piston and of the valve housing wall in the area of the annular gap have an adverse effect on the functioning of the temperature compensation, and reduce the lifespan of the fuel injector.

Moreover, the conventional temperature compensation device has a high constructive expense, which increases the manufacturing costs of the fuel injector. A further disadvantage is that the leakage defined by the annular gap can be modified only by modifying the manufacturing process, so that the temperature compensation cannot be adapted to the specific requirements of use of the fuel injector.

SUMMARY

The fuel injector according to the example embodiment of the present invention has the advantage that it has a wear-free temperature compensation device that has a simple design, is easy to install, and can be applied universally.

A further advantage is that due to the construction of the throttle, in particular the cross-section thereof, the temperature compensation device can be easily and economically adapted to the specific requirements of a fuel injector.

In the example embodiment of the present invention, it is advantageous that the housing of the temperature compensation device has a first and second pressure plate, the pressure plates being oriented at least approximately perpendicular to the direction of actuation of the actuator. This provides an advantageous transmission of the actuating force of the actuator on the valve closing element, which works together with the valve seat face to form the seal seat.

In the example embodiment of the present invention, it is advantageous that the housing of the temperature compensation device has an elastic casing, connected at its ends with the pressure plates. Here it is particularly advantageous that the casing is fashioned so as to be multiply folded, or so as to have a waved shape. This provides a simple and useful construction of the temperature compensation device.

Advantageously, in the example embodiment of the present invention, one face of the actuator rests on a bearing surface of the first pressure plate. The direct transmission of force of the actuator onto the first pressure plate of the temperature compensation device provides a particularly advantageous transmission of force.

Advantageously, in the example embodiment of the present invention, the throttle is formed by a recess (opening) in the housing of the temperature compensation device. This provides a low-maintenance, wear-free, and economical construction of the throttle of the temperature compensation device.

In the example embodiment of the present invention, it is advantageous that the opening is provided in the second pressure plate. Because the second pressure plate is not elastically deformed, in this way an at least almost constant throttling of the throttle is provided.

In the example embodiment of the present invention, it is advantageous that the temperature compensation device has a return spring situated in the interior of the temperature compensation device. In this way, the vacuum unit can be held in non-positive contact with the actuator via a spring in the interior of the unit, and in addition with, for example, a valve needle or a housing of the fuel injector.

BRIEF DESCRIPTION OF THE DRAWINGS

Exemplary embodiments of the present invention are represented in simplified form in the drawings, and are explained in more detail in the following specification.

DETAILED DESCRIPTION

Figure 1:
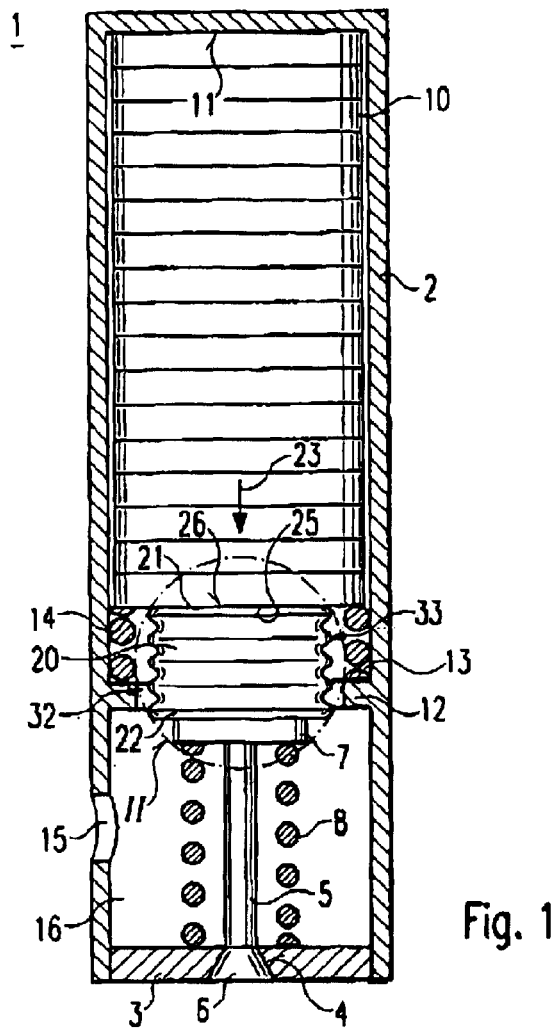
FIG. 1 shows an axial section through a first exemplary embodiment of the fuel injector according to the present invention.

FIG. 1 shows, in a partial axial sectional view, an a fuel injector 1 according to an example embodiment of the present invention. In this example embodiment, fuel injector 1 is realized as externally opening fuel injector 1. Fuel injector 1 is used in particular for the direct injection of fuel, in particular gasoline, into a combustion chamber of a mixture compressing, externally ignited internal combustion engine, as what is known as a gasoline direct injector. The example fuel injector 1 is however also suitable for other applications.

Fuel injector 1 has a valve housing 2 that is shown in a simplified view. At the end of fuel injector 1 at the point of injection, valve housing 2 is connected with a valve seat element 3 that has a valve seat face 4. Valve seat face 4 works together with a valve closing element 6, which can be actuated by a valve needle 5, to form a seal seat. In this exemplary embodiment, valve closing element 6 is fashioned in one part with valve needle 5. Valve needle 5 is connected with an intermediate plate 7, on which a closing spring 8 is supported. Moreover, intermediate plate 7 enables an advantageous transmission of force to valve needle 5. Closing spring 8 is supported on the one hand on intermediate plate 7 and on the other hand on valve seat element 3; in this way, the seal seat formed by valve closing element 6 and valve seat face 4 is loaded with a closing force.

In the interior of fuel injector 1, there is situated a piezoelectric or magnetostrictive actuator 10, supported at the end of fuel injector 1 opposite the point of injection on an interior surface 11 of valve housing 2. Valve housing 2 has a circumferential collar 12 in the interior of fuel injector 1. Collar 12 has an annular bearing surface 13 on which a pre-stress spring 14 is supported, through which actuator 10 is loaded with a preliminary stress.

In addition, valve housing 2 of fuel injector 1 has an opening 15 that forms a fuel inlet for the flow of fuel into a fuel chamber 16 of fuel injector 1. In this exemplary embodiment, the fuel inlet is provided laterally on valve housing 2 of fuel injector 1.

In the interior of fuel injector 1, a temperature compensation device 32 is provided that includes an elastic casing 20, a first pressure plate 21, and a second pressure plate 22. Here, elastic casing 20 is connected with first pressure plate 21 and with second pressure plate 22, forming a housing 33 of temperature compensation device 32. The connection of elastic casing 20 with first pressure plate 21 and with second pressure plate 22 here seals an interior space 34 (FIG. 2) of housing 33 of temperature compensation device 32 against fuel chamber 16.

Housing 33 of temperature compensation device 32 has a throttle 35. Throttle 35 can, for example, be formed by an opening 31 in elastic casing 20 and/or first pressure plate 21 and/or second pressure plate 22. Throttle 35 can also be formed otherwise, for example by a metallic tube, or by chambers in the interior of housing 33 of temperature compensation device 32.

Throttle 35 provided in temperature compensation device 32 connects interior space 34 of housing 33 of temperature compensation device 32 with fuel chamber 16 with respect to fuel inlet 15, so that an entry and exit of fuel into housing 33 of temperature compensation device 32 is enabled. A throttling of the entry and exit of fuel into housing 33 of temperature compensation device 32 is set through the cross-section of throttle 35. Here, the setting of the cross-section takes place such that, given a temperature-caused change of length of components of fuel injector 1, e.g. of actuator 10 or valve needle 5, a quasi-static change of length of temperature compensation device 32 takes place in order to compensate the temperature-caused change in length, and such that in addition, given an actuation of actuator 10, a change of length of temperature compensation device 32 is at least approximately omitted (stopped), so that the change of length of actuator 10 that took place upon actuation of actuator 10 is transmitted to valve closing element 6.

Temperature compensation device 32 thus acts as a mechanical high-pass filter whose transmission characteristic can be set is via the cross-section of throttle 35, this setting taking place in such a way that a transmission on the time scale of an actuation cycle of fuel injector 1 takes place in at least almost undampened fashion. Temperature compensation device 32 of fuel injector 1 can therefore be adapted to various demands through the cross-section of throttle 35.

In order to achieve an advantageous transmission of force of actuator 10 to valve closing element 6, one face 25 of actuator 10 is adjacent to a bearing surface 26 of first pressure plate 21, pressure plate 21 being oriented perpendicular to a direction of actuation 23 of actuator 10. Moreover, second pressure plate 22 is also oriented perpendicular to direction of actuation 23 of actuator 10, so that a change of length of actuator 10 in direction of actuation 23 effects a valve needle stroke of valve needle 5, through which valve closing element 6 is lifted from valve seat face 4, and the fuel is injected out of fuel injector 1 from fuel chamber 16 via the gap that arises between valve closing element 6 and valve seat face 4.

So that a corresponding enlargement of housing 33 of temperature compensation device 32 takes place when there is a temperature-caused change in length of components of fuel injector 1, resulting in an enlargement of the distance between face 25 of actuator 10 and intermediate plate 7 (e.g., when there is a cooling of actuator 10 or of valve needle 5), in this exemplary embodiment first pressure plate 21 at bearing surface 26 is connected with face 25 of actuator 10, and second pressure plate 22 is connected with intermediate plate 7. Here, the connection takes place in non-positive form, e.g. through gluing, beading (forming a flange or seam), or welding.

Elastic casing 20 can be fashioned so as to be multiply folded, or with a waved shape. In this way, large temperature-caused changes of length of components of fuel injector 1 can be compensated.

Figure 2:
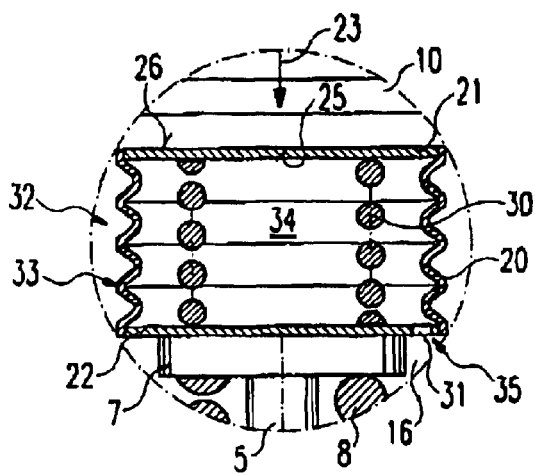
FIG. 2 shows a second exemplary embodiment of the detail designated II in FIG. 1.

FIG. 2 shows a second exemplary embodiment of the detail designated II in FIG. 1, in a partial sectional representation. In contrast to the first exemplary embodiment, temperature compensation device 32 of the second exemplary embodiment has, in addition, a return spring 30 provided in interior space 34 of housing 33 of temperature compensation device 32. (Elements already specified have reference characters that agree, so that it is not necessary to specify them again.)

In this exemplary embodiment, housing 33 of temperature compensation device 32 is loaded with a pre-stress by return spring 30, which acts on the two pressure plates 21 and 22. When there is a temperature-caused change of length of components of fuel injector 1, resulting in an enlargement of the distance between intermediate plate 7 and face 25 of actuator 10, through the pre-stress produced by return spring 30 an extension of housing 33 of the temperature compensation is achieved along direction of actuation 23 of actuator 10. In this exemplary embodiment, a positively locking connection of first pressure plate 21 at bearing surface 26 with face 25 of actuator 10 can therefore be omitted, because a non-positive connection of first pressure plate 21 on bearing surface 26 with face 25 of actuator 10 is achieved via return spring 30 in interior space 34 of housing 33 of temperature compensation device 32. Correspondingly, second pressure plate 22 is connected with intermediate plate 7 in non-positive fashion, but not in positively locking fashion.

In this exemplary embodiment, second pressure plate 22 has an opening 31, by which throttle 35 is formed in the housing of the temperature compensation device. Opening 31 is provided outside a bearing surface at which intermediate plate 7 is adjacent to second pressure plate 22, so that, opening 31 is not covered by intermediate plate 7. Moreover, opening 31 faces fuel chamber 16, so that the entry and exit of fuel into housing 33 of temperature compensation device 32 can take place in unhindered fashion when there is a temperature-caused change of length of components of fuel injector 1.

Figure 3:
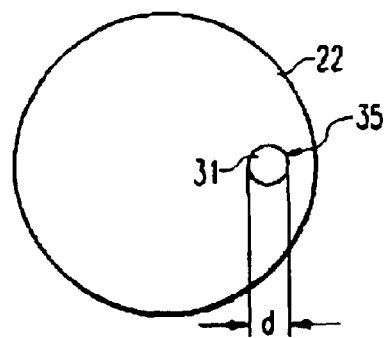
FIG. 3 shows second pressure plate 22 of the second exemplary embodiment.

FIG. 3 shows second pressure plate 22, shown in FIG. 2, of the second exemplary embodiment. Here, throttle 35 in housing 33 of temperature compensation device 32 is formed by opening 31 in second pressure plate 22. Because in this exemplary embodiment opening 31 is fashioned with a circular shape, the cross-section of throttle 35 can be set via diameter d of opening 31.

The present invention is not limited to the described exemplary embodiments. In particular, the present invention is also suitable for an internally opening fuel injector 1. Moreover, temperature compensation device 32 can also be situated at different positions in fuel injector 1. In particular, actuator 10 on face 25 can act directly on intermediate plate 7, and temperature compensation device 32 can be adjacent to inner surface 11 of valve housing 2 of fuel injector 1 with one of pressure plates 21, 22, whereby actuator 10 then acts on inner surface 11 via temperature compensation device 32.

What is claimed is:

1. A fuel injector, comprising:

an actuator, the actuator being one of a piezoelectric actuator or a magnetostrictive actuator;

a valve closing element, the actuator configured to actuate the valve closing element, the valve closing element acting together with a valve seat face to form a seal seat; and a temperature compensation device including a housing that is elastically deformable along a direction of actuation of the actuator, the temperature compensation device further including at least one throttle that connects an interior space of the housing with a fuel inlet of the fuel injector, a cross-section of the throttle being dimensioned so that entry and exit of fuel into the housing is enabled when there is a temperature-caused change in length of components of the fuel injector.

2. The fuel injector according to claim 1, wherein the fuel inlet is arranged outside of the housing of the temperature compensation device.

3. The fuel injector according to claim 1, wherein the throttle is configured as a metallic tube.

4. The fuel injector according to claim 1, wherein the throttle includes at least one chamber arranged in the interior space of the housing.

5. A fuel injector comprising:

an actuator, the actuator being one of a piezoelectric actuator or a magnetostrictive actuator;

a valve closing element, the actuator configured to actuate the valve closing element, the valve closing element acting together with a valve seat face to form a seal seat; and a temperature compensation device including a housing that is elastically deformable along a direction of actuation of the actuator, the temperature compensation device further including at least one throttle that connects an interior space of the housing with a fuel inlet of the fuel injector, a cross-section of the throttle being dimensioned so that entry and exit of fuel into the housing is enabled when there is a temperature-caused change in length of components of the fuel injector;

wherein the housing of the temperature compensation device includes a first pressure plate and a second pressure plate, the first pressure plate and the second pressure plate being oriented at least approximately perpendicular to the direction of actuation of the actuator.

6. The fuel injector according to claim 5, wherein the fuel injector is configured for a fuel injection system of an internal combustion engine.

7. The fuel injector according to claim 5, wherein the housing of the temperature compensation device includes an elastic casing, ends of the elastic casing being connected with the first pressure plate and the second pressure plate.

8. The fuel injector according to claim 7, wherein the casing one of: i) includes multiple folds, or ii) is wave shaped.

9. The fuel injector according to claim 5, wherein a face of the actuator is adjacent to a bearing surface of the first pressure plate.

10. The fuel injector according to claim 5, wherein the throttle is formed by an opening in the housing of the temperature compensation device.

11. The fuel injector according to claim 10, wherein the opening is provided in the second pressure plate.

12. The fuel injector according to claim 5, wherein the actuator is configured to act on the valve closing element via the temperature compensation device.

13. The fuel injector according to claim 5, wherein the temperature compensation device includes a return spring situated in the interior space of the temperature compensation device.

\* \* \* \* \*